United States Patent [19]
Clark et al.

[11] Patent Number: 5,925,243
[45] Date of Patent: Jul. 20, 1999

[54] INLINE CARTRIDGE FILTER

[75] Inventors: Gary D. Clark, Norman, Okla.; Johnny H. Wong; Christopher L. Loafman, both of Gastonia, N.C.; Michael D. Adams, Bessemer City, N.C.

[73] Assignee: Dana Corporation, Toledo, Ohio

[21] Appl. No.: 08/799,098

[22] Filed: Feb. 11, 1997

[51] Int. Cl.$^6$ .................................................. C02F 1/50
[52] U.S. Cl. ........................ 210/206; 210/209; 210/446; 210/493.1
[58] Field of Search ................................. 210/205, 206, 210/443, 448, 446, 209, 493.1, 493.5

[56] References Cited

U.S. PATENT DOCUMENTS

| | | | |
|---|---|---|---|
| 705,447 | 7/1902 | Sargent | 210/209 |
| 1,693,741 | 12/1928 | Wuest . | |
| 2,100,266 | 11/1937 | Perry . | |
| 3,240,346 | 3/1966 | Callahan, Jr. et al. . | |
| 3,357,563 | 12/1967 | Sicard | 210/209 |
| 4,540,489 | 9/1985 | Barnard . | |
| 4,642,192 | 2/1987 | Heskett . | |
| 4,780,197 | 10/1988 | Schuman | 210/206 |
| 5,024,268 | 6/1991 | Cheadle et al. | 210/209 |
| 5,024,761 | 6/1991 | Deibel | 210/446 |
| 5,050,549 | 9/1991 | Sturmon | 210/209 |
| 5,069,799 | 12/1991 | Brownawell et al. | 210/209 |
| 5,126,046 | 6/1992 | Gomez | 210/446 |
| 5,164,085 | 11/1992 | Spokoiny et al. . | |
| 5,269,919 | 12/1993 | Von Medlin . | |
| 5,385,667 | 1/1995 | Steger | 210/446 |
| 5,401,399 | 3/1995 | Magnusson et al. | 210/206 |
| 5,415,770 | 5/1995 | Heskett | 210/202 |
| 5,580,447 | 12/1996 | Platter et al. | 210/206 |
| 5,656,159 | 8/1997 | Spencer et al. | 210/206 |
| 5,662,799 | 9/1997 | Hudgens et al. | 210/192 |

*Primary Examiner*—Peter A. Hruskoci
*Attorney, Agent, or Firm*—Millen, White, Zelano, & Branigan, P.C.

[57] ABSTRACT

An inline cartridge filter for treating coolant liquid used to cool industrial application such as cooling towers and chillers, combustion engine includes an annular filter media disposed around a cylindrical biological control element which includes a biocide for controlling the growth of bacteria and a pH control agent for controlling the growth of algae in the coolant liquid. The filter media and biological control element form a disposable filter element which is mounted in a housing.

8 Claims, 1 Drawing Sheet

5,925,243

INLINE CARTRIDGE FILTER

FIELD OF THE INVENTION

The present invention is directed to an inline cartridge filter. More particularly, the present invention is directed to an inline cartridge filter which combines filtering with control of organism growth.

BACKGROUND OF THE INVENTION

Over time, the liquid coolant used to cool industrial applications such as chillers and cooling towers degrades due to growth of bacteria and algae. Accumulation of these organisms can clog cooling systems and coat cooling system components, compromising efficiency and effectiveness.

Generally, filtering of coolant solutions and control of bacterial and algae growth in coolant solutions are accomplished in a two-stage process at a filtering site and at a biocide site in which chemicals used for biological control are recycled. Difficulties arise with prior art approaches because chemical treating solutions, separate from the coolant solutions are used for biological control. Moreover, the life of liquid coolant is shortened because biological growth is not prevented in the first phase. In addition, there are environmental problems and expense related to disposing of degraded liquid coolant.

If the two stage process is eliminated and the need to dispose of biologically contaminated coolant is minimized, much expense and trouble can be avoided.

SUMMARY OF THE INVENTION

In view of the aforementioned difficulties, and other difficulties in filtering coolant liquids and controlling biological growth in coolant liquids, it is a feature of the present invention to provide an inline cartridge which performs both functions.

The present invention is directed to a filter assembly comprising a housing with an inlet and an outlet, a filter media disposed in the housing between the inlet and outlet and a biological control material disposed between the filter media and the outlet.

In accordance a more specific aspect of the invention, the present assembly is configured as an inline cartridge with the filter media and biological control material being positioned adjacent to one another within the housing.

In a still more specific aspect of the invention, the biological control material is configured in the form of a substantially cylindrical member disposed within a substantially cylindrical filter, wherein the liquid being treated passes first through the filter to remove particulate matter therefrom and then through the biological control material to inhibit the growth of bacteria and algae in the liquid.

In still a further aspect of the invention, the filter media and biological control material are mounted in a housing for separate disposal with the housing being re-usable upon replacing the filter media and biological control material.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
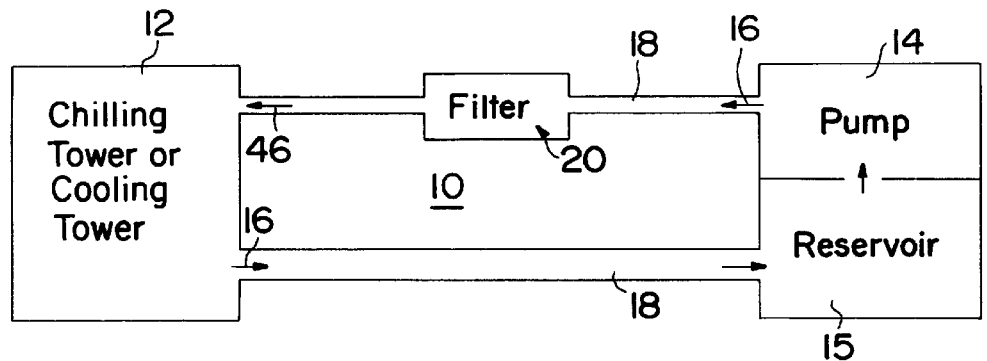
FIG. 1 is a schematic view showing a filter configured in accordance with the principles of the present invention disposed in the cooling system of an industrial cooling tower/chiller.

Referring now to FIG. 1, there is shown cooling system 10 for cooling tower/chiller combustion engine or the like, wherein the cooling system includes a radiator cooling tower/chiller 12, a pump 14 and a reservoir 15. The pump 14 pumps a coolant liquid 16 from the reservoir 15 through lines or passageways 18 and through an inline cartridge 20, which inline cartridge 20 is configured in accordance with the principles of the present invention. While the cooling system 10 is an embodiment of a system for utilizing the inline cartridge 20, the inline cartridge may be used in other systems in which biological contamination is a problem.

The coolant liquid 16 tends to accumulate solid debris created by the growth of bacteria and algae in the liquid. This solid debris can coat passageways such as piping radiator passageways, inlet and outlet lines and mechanical surfaces, such as the surfaces of thermostats and pump components, thus compromising the efficiency and effectiveness of the cooling system. In the past, the remedy to this problem was to remove and dispose of the coolant and circulate chemicals through the system which would destroy the bacteria and algae. Unfortunately, residue of the bacteria and algae can remain even after treatment with chemicals. Moreover, the new coolant can itself become infected with bacteria and algae spores, resulting in reoccurrence of the problem.

Figure 2:
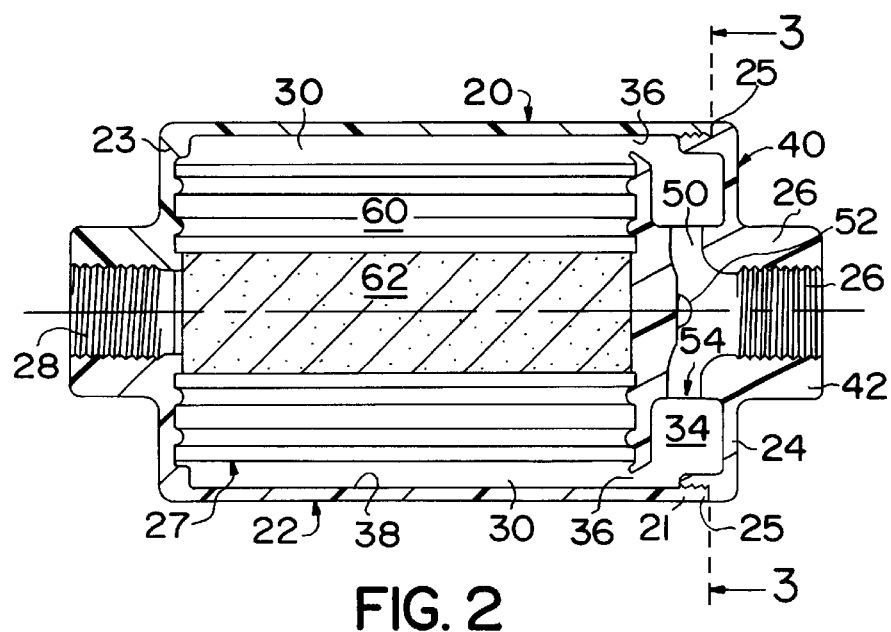
FIG. 2 is a side elevation of a filter cartridge including a biological control element utilized in the system of FIG. 1.
Figure 3:
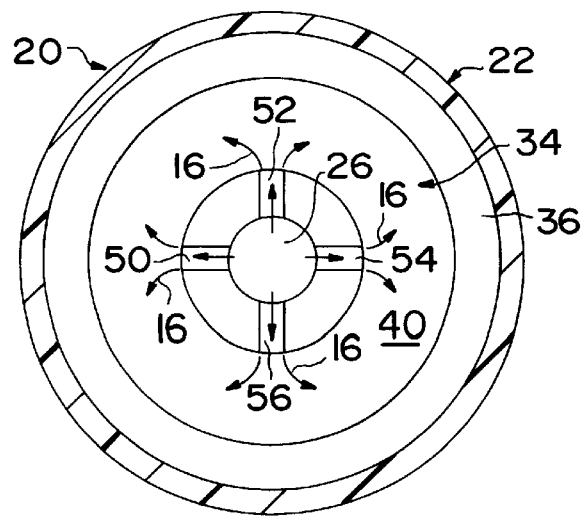
FIG. 3 is an elevation taken along lines 3—3 of FIG. 2.

Referring now more specifically to FIGS. 2 and 3, the inline cartridge 20 is configured and utilized so as to eliminate the problems with current cooling systems 10. The inline cartridge 20 is comprised of a housing 22 having an open threaded end 21 and a closed end 23. A cap 24 is threaded into the open threaded end 21 of the housing 22. The cap 24 seats against a gasket 25 and has an inlet 26 therethrough which is connected to an outlet line 18 of the pump 14 (see FIG. 1), the inlet communicates with a filter element 27 through which the coolant liquid 16 passes before exiting through an outlet 18. The outlet 18 is connected to the cooling tower/chiller 12 of FIG. 1.

Around the filter element 27 is an annular space 30. The annular space 30 communicates with annular plenum 34 via an annular gap 36 between the wall 38 of the housing 22 and a base 40 which provides support for the bottom of the filter element 27.

The base 40 is unitary with the cap 24 which closes the threaded end 21 of the housing 22. The base 40 includes a neck 42 through which the inlet 26 passes and within the base 40 are four radially extending passageways 50, 52, 54 and 56. The radially extending passageways 52–56 communicate with the plenum 34 so that as the liquid coolant 16 enters the inlet 26 and passes through the passageways 52–56, it is generally uniformly distributed within the plenum 34.

Since the liquid coolant 16 is under pressure, it flows from the plenum 34 into the annular space 32 and then through the filter element 27. The base 40 presses the filter element 27 against the closed end 23 of the housing 22 as the top 24 is threaded into the end 21 of the wall 38 of housing 22. In order to change the filter element 27, the cap 24 is unscrewed from the housing 22 so that the filter element 27 can be withdrawn from the housing and replaced with a fresh filter element.

The filter element 27 includes an annular outer filter media 60. This filters particles from the liquid 16. The filter media 60 can be pleated or annular block. The material of the filter element 27 may be synthetic or cellulose.

Within the filter media 60 is an inner biological element 62 which includes a biological agent. Mechanically, the biological element 62 is preferably relatively rigid and stiff, or granular with a housing, so as to support the filter media 60, in this case, a pleated media.

In a preferred embodiment, the biological control element 62 includes an atomized high purity copper/zinc alloy, such as KDF 55 or KDF 85 available from KDF Fluid Treatment, Inc. of Three Rivers, Mich., and covered by U.S. Pat. Nos. 4,642,192; 5,122,274; 5,135,654; 5,198,118; 5,275,737; 5,314,623; 5,415,770; and/or 5,433,856, each incorporated herein by reference. Preferably, the material is incorporated in a cylindrical brass substrate. Also incorporated in the biological control element 62 is a material which controls the pH of the liquid 16 so as to discourage growth of algae, which material is either in addition to or part of the KDF material.

Hence, the circulating coolant liquid 16 is repeatedly exposed to the biological pH control material as the coolant circulates. While the pump 14 is pumping, the coolant 16 is continuously being treated so as to minimize biological degradation. By pre-filtering the coolant liquid 16 with the filter media 60, particulate matter is removed from the coolant liquid before it passes through the biological control element 62. Consequently, the biological control element 62 does not become clogged with particulate matter and directly treats any liquid and only the minute biological cultures which may be entrained in the liquid 16.

Eventually, the filter media 60 will accumulate enough debris to threaten the efficiency of the cooling system 10, at which time the filter element 27 should be replaced. Replacement is relatively simple since all one need do is unscrew the cap 24 from the housing 22 to open the housing for receipt of a replacement filter element 27. Ideally, replacement will occur periodically as an item of a maintenance schedule concurrent with other maintenance items and will eliminate the need for disposing of coolant due to contamination with bacteria or algae.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A filter assembly for treating a liquid comprising:

a housing with an axial inlet and an axial outlet at opposite ends of the housing;

a filter media in the housing disposed between the inlet and outlet, the filter media defining a cylindrical space therein and an annular space between the filter media and the housing in communication with the inlet; and a biological control element comprised of an atomized high purity copper/zinc alloy disposed in the cylindrical space of the filter media and aligned with and in communication with the outlet, wherein fluid passing into the inlet and out of the outlet is first filtered by the annular filter media to remove particulate matter from the fluid and then passes in a radial direction through the biological control element and is treated by the biological control element to control biological growth in the fluid.

2. The filter assembly of claim 1, wherein the biological control element includes a pH control agent as well as a biocidal agent.

3. The filter assembly of claim 2, wherein the biocidal agent and pH control agents are incorporated in a structure, which structure provides support for the filter media.

4. The filter assembly of claim 3, wherein the filter media is a pleated filter media.

5. The filter assembly of claim 1, wherein the biological control element is incorporated in a cylindrical brass substrate.

6. The filter assembly of claim 5, wherein the brass substrate is a rigid cylinder.

7. The filter assembly of claim 6, wherein the liquid is a liquid coolant.

8. The filter assembly of claim 1, wherein the liquid is a liquid coolant used in cooling towers.

\* \* \* \* \*